No. 893,561. PATENTED JULY 14, 1908.
A. A. AMBLER.
DROP HAMMER.
APPLICATION FILED NOV. 28, 1904.

5 SHEETS—SHEET 1.

Witnesses
E. Howard Walmsley
Irvine Miller

Inventor
Arthur A. Ambler,
By H. A. Fowler

No. 893,561. PATENTED JULY 14, 1908.
A. A. AMBLER.
DROP HAMMER.
APPLICATION FILED NOV. 28, 1904.
5 SHEETS—SHEET 2.
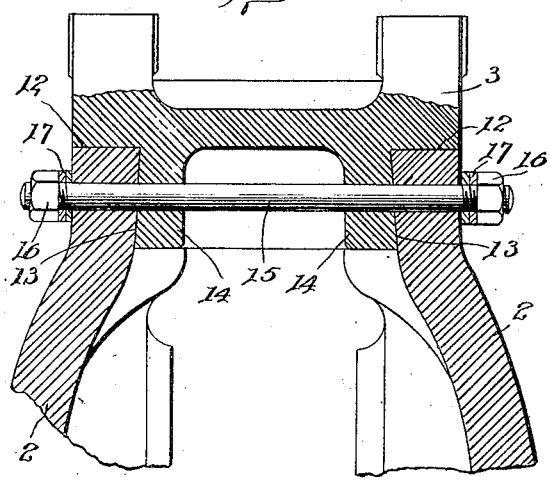
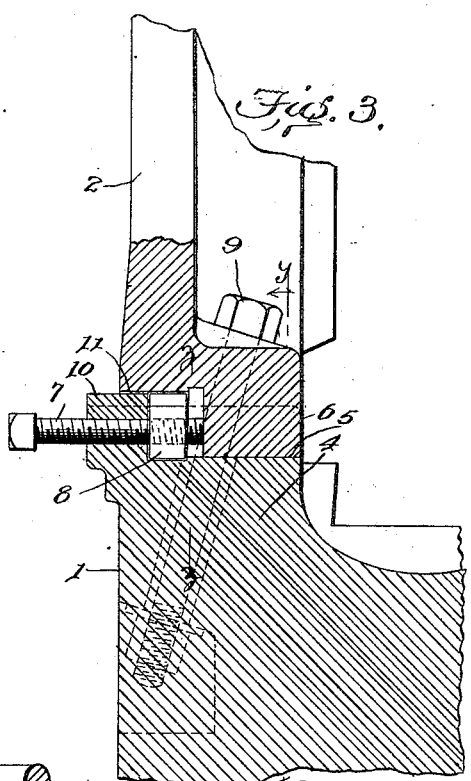
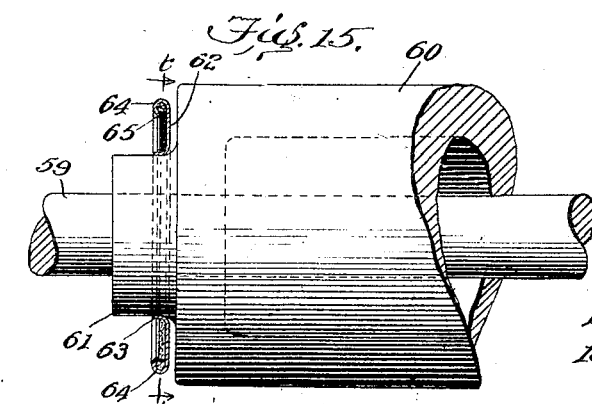
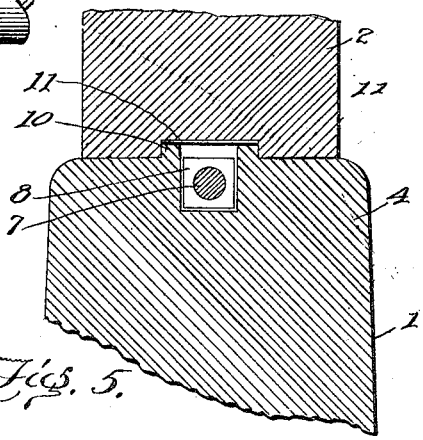
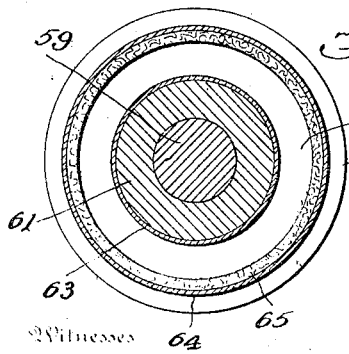
Witnesses
J. P. Campbell
Irome Miller
Inventor
Arthur A. Ambler,
By H. A. Toulmin,
Attorney

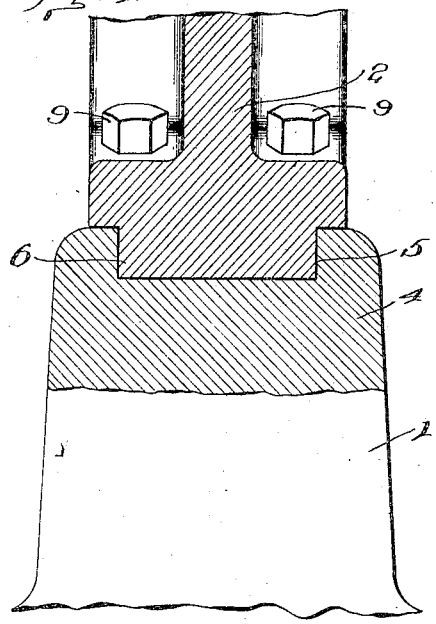
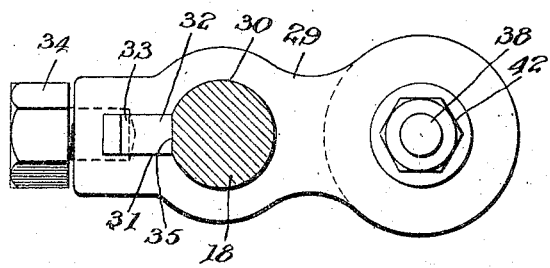
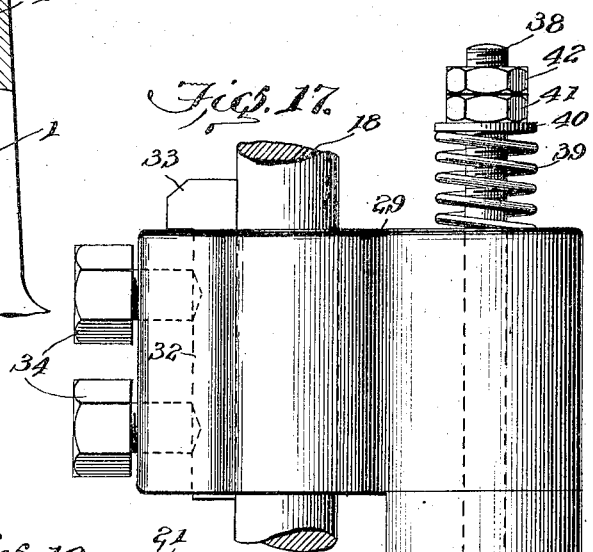
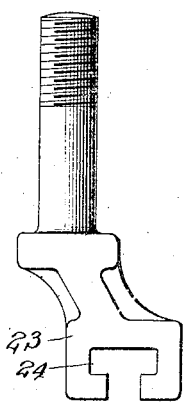
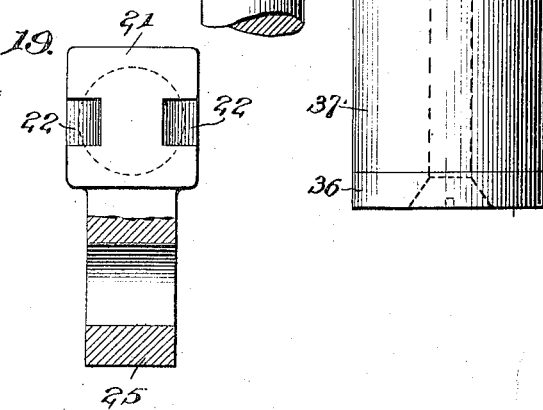

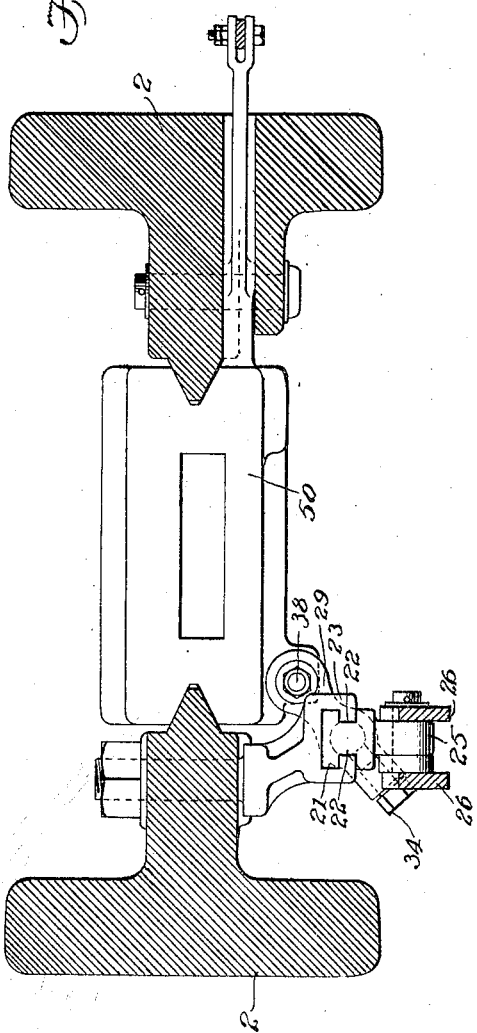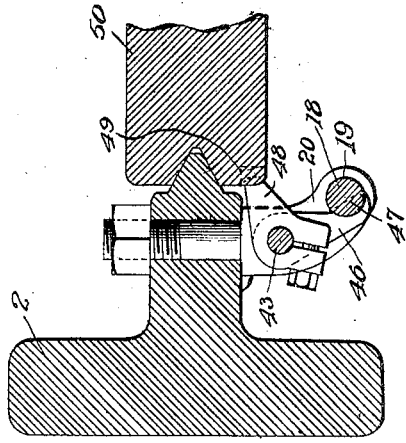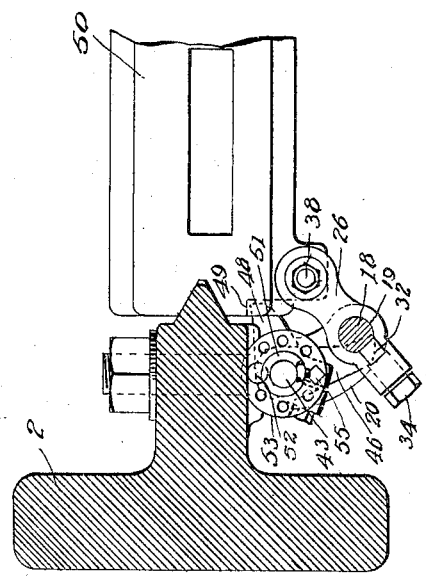

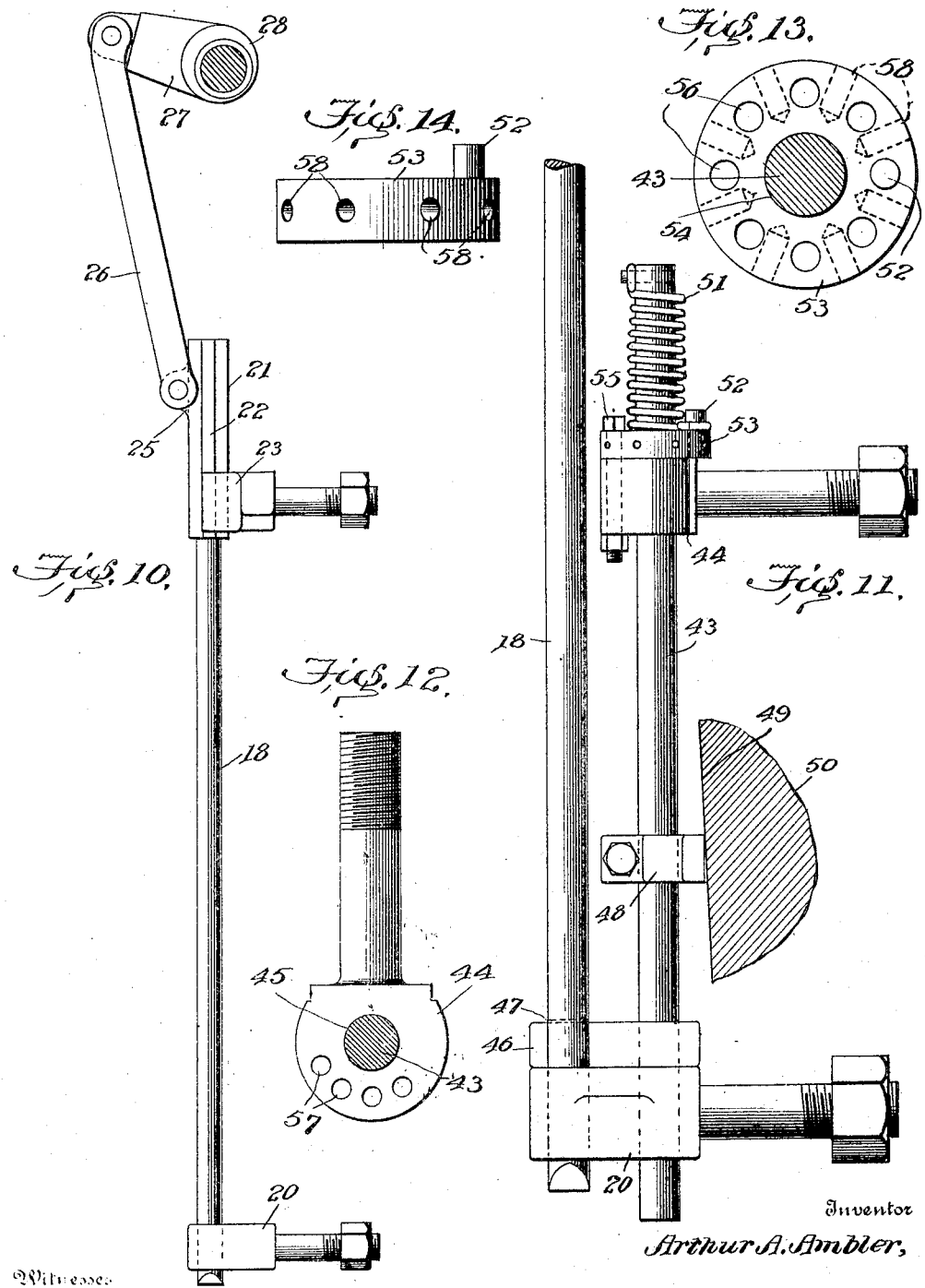

UNITED STATES PATENT OFFICE.

ARTHUR A. AMBLER, OF SPRINGFIELD, OHIO.

DROP-HAMMER.

No. 893,561. Specification of Letters Patent. Patented July 14, 1908.

Application filed November 26, 1904. Serial No. 234,651.

*To all whom it may concern:*

Be it known that I, ARTHUR A. AMBLER, a citizen of the United States, residing at Springfield, in the county of Clark and State of Ohio, have invented certain new and useful Improvements in Drop-Hammers, of which the following is a specification, reference being had therein to the accompanying drawings.

This invention relates to drop hammers and has for its object to provide a structure of this character which shall be strong and durable in construction and of superior efficiency in operation.

More specifically, my present invention relates to certain improvements in the construction of the frame, whereby greater strength and durability are obtained in the connection of the ways to the base and to the head; to certain improvements in the mode of mounting and guiding the drop rod; to an improved buffer for the drop rod, which shall have increased durability, shall be less noisy in operation and which may be more readily adjusted upon the drop rod; to an improved construction and arrangement of the spring which controls the latch and tripping arm of the automatic trip; and to the provision of means for preventing the lubricating-oil from having access to the lifting rolls and thereby affecting their grip.

To these ends my invention consists in certain novel features which I will now proceed to describe, and will then particularly point out in the claims.

Figure 1:
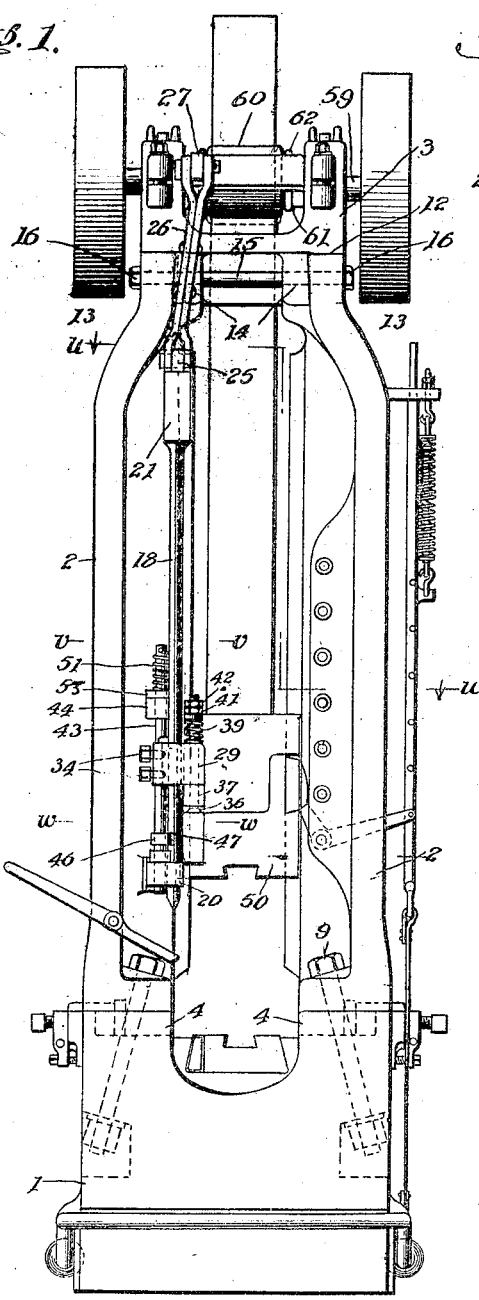
Figure 2:
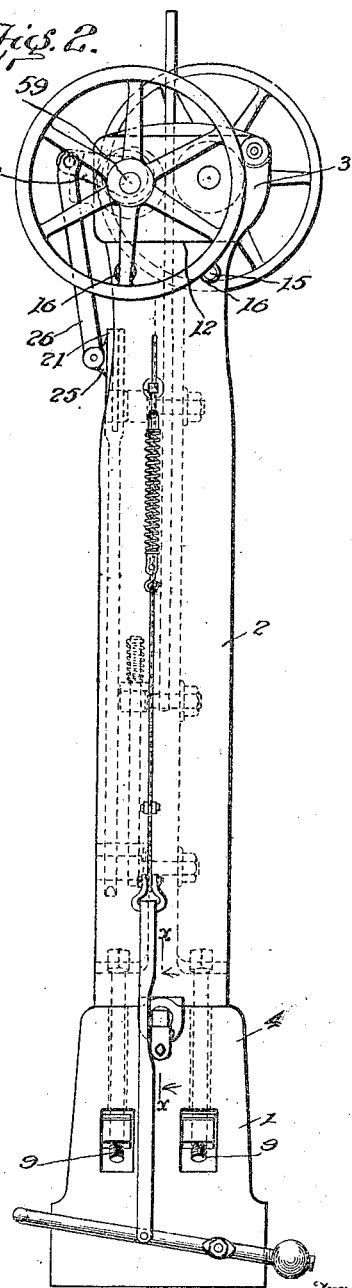

In the accompanying drawings, Figure 1 is a front elevation of a drop hammer embodying my invention in one form; Fig. 2 is a side elevation of the same; Fig. 3 is an enlarged detail sectional view, taken on the line $x\,x$ of Fig. 2 through the lower portion of one of the ways or uprights and the adjacent part of the base, looking in the direction of the arrows; Fig. 4 is a detail sectional view, taken on the line $y\,y$ of Fig. 3 and looking in the direction of the arrows; Fig. 5 is a similar view, taken on the line $z\,z$ of Fig. 3 and looking in the same direction; Fig. 6 is a detail vertical section through the head and the upper ends of the ways or uprights; Fig. 7 is a plan section, taken on the line $u\,u$ of Fig. 1; Fig. 8 is a detail plan section of one side of the structure, taken on the line $v\,v$ of Fig. 1; Fig. 9 is a similar view, taken on the line $w\,w$ of Fig. 1; Fig. 10 is a detail elevation of the drop rod, its supports and a portion of its connections, detached; Fig. 11 is a similar view of the automatic trip mechanism; Fig. 12 is a top plan view of the upper bearing of the trip rock shaft, detached; Fig. 13 is a similar view of the tension plate coöperating therewith; Fig. 14 is a side elevation of the same; Fig. 15 is a detail elevation, partly in section, of one of the rolls; Fig. 16 is a sectional view of the same, taken on the line $t\,t$ of Fig. 15 and looking in the direction of the arrows; Fig. 17 is a detail view of the bumper, in elevation, showing the same attached to the drop rod; Fig. 18 is a plan view of the same; and Figs. 19 and 20 are detail views of the upper end of the drop rod and its guide.

Referring first to those features of my invention which relate to the construction of the frame of the machine, said frame consists, as usual, of a base or anvil 1, uprights, side members or ways 2, and a head 3. The base is provided on each side with the usual upward extension 4, which forms a support for the corresponding upright, and is grooved or recessed, as indicated at 5, for about one-half of its width, to receive the corresponding interlocking projections 6 on the lower end of the upright 2. Through the remaining portion of the support 4 there extends an adjusting screw 7, which passes through a nut 8, set in a suitable recess in the support, and bears against the vertical face of the projection 6 on the lower end of the upright for the purpose of adjusting the same. The usual connecting bolts 9 pass through the parts to secure them together. So far as the construction has been just described, it is one usually employed. Since the groove 5 and engaging projection 6 extend only part way across the meeting surfaces of the upright and base, the outer portion of the lower end of the upright is, in said usual construction, left without any support against transverse strains. To overcome this defect, I provide on the upper part of that portion of the support 4 which lies outward beyond the recess 5, and through which the adjusting screw 7 passes, an upward projection 10, which fits a corresponding recess 11 in the under face of the corresponding portion of the upright. By reason of this construction, the upright is supported against transverse strains at its lower end across its entire lower face through the interlocking of the respective projections and recesses on the base and upright.

The upper ends of the uprights terminate in flat horizontal bearing surfaces 12, on which the under surface of the head 3 rests directly at each side. The faces of the upper ends of the upright lying opposite each other are downwardly and outwardly inclined, as indicated at 13, and the head has a downward extension 14, which fits between the upper ends of the uprights and has its outer faces similarly inclined. Bolts 15 pass through these overlapping portions of the head and uprights, and are provided on their projecting ends with nuts 16 and yielding washers 17, of leather or the like, interposed between said nuts and the outer faces of the uprights. When the hammer is in use, the maximum strain between the head and uprights is one which tends to separate them in a vertical direction, and it has heretofore been sought to resist this strain by interlocking projections between the head and uprights, presenting two or more opposing surfaces meeting in horizontal planes and resisting separation of the parts in either direction. In practice, it has been found that this eventually leads to the fracture of the interlocking parts. This difficulty is overcome by the construction which I have devised, in which there is only one horizontal meeting plane of the parts, which does not tend to prevent separation thereof, said separation being resisted by the diverging meeting surfaces of the head and uprights, and the bolts which prevent lateral separation thereof. The yielding washers permit sufficient play of the parts to prevent any fracture thereof, while the construction is such that the frame members at the top of the machine are held together with a firmness sufficient to meet the requirements of the structure.

Referring next to the construction of the drop rod, the lower portion or body thereof, indicated by the reference numeral 18, is of the usual circular cross section, and moves through an aperture 19 of similar section in a guiding arm 20 near its lower end. The upper end or head 21 of the drop rod is, however, approximately square in cross section, being provided on each side with a groove 22, as shown more particularly in Fig. 19, and reciprocates in a guide 23 which receives the rear portion of the head 21 and has a T-shaped slot 24, as shown in Fig. 20, to receive said rear portion of said head. On the front of the head there is provided a lug 25, to which is pivoted the lower end of a connecting rod 26, the upper end of which is pivoted to an arm 27 which controls the eccentrics 28 which shift the movable roll toward and from its companion roll. By reason of this construction, the drop rod is entirely free from the lateral strains to which it is subjected when its upper end is directly connected to the eccentric arm, and it is therefore free to move vertically in its guides with a minimum of friction. The construction of the head 21 of the drop rod and its guide are such as to prevent any twisting or turning of the rod around its longitudinal axis, and at the same time to provide a suitable bearing to meet the strains caused by the connection of the connecting rod 26 to the lug at one side of the head.

The bumper against which the hammer strikes to lift the drop rod comprises a body 29, having an aperture 30 therein to receive the drop rod, and a key way 31 communicating therewith to receive a key or spline 32, having a retaining head 33 which rests on top of the body 29. Set screws 34 pass through the end of the body 29 and bear against the key 32, so as to force the same against the drop rod and clamp the bumper in any desired position thereon. The drop rod has the face thereof against which the key 32 bears flattened, as indicated at 35, so that when the set screws are loosened to permit adjustment of the bumper, said bumper is prevented from rotating around the rod and thus becoming displaced relatively to the portion of the hammer which is to contact with it.

The bumper proper comprises a steel contact plate 36, and a rubber cushion 37 interposed between said plate and the under side of the body 29. A screw bolt 38 passes through the plate 36, in which its head is countersunk, and thence loosely upward through the rubber cushion 37 and body 29, above which body it extends sufficiently to receive a coiled spring 39. Said spring bears on top of the body 29 and against a washer 40 on the bolt 38, said washer being held in position by an adjusting nut 41 and lock nut 42. The spring 39 serves to always hold the contact plate against the rubber cushion, taking up the slack of said plate and of the bolt 38 when the cushion is compressed by the shock of contact, and thereby preventing looseness and rattling of the parts, with the consequent noise and wear.

The automatic trip mechanism comprises a vertical rock shaft 43, mounted at its lower end in a suitable bearing in the arm 20 and at its upper end in a suitable bearing in an arm 44, which has an aperture 45 to receive said rock shaft. This rock shaft carries the usual latch 46 to engage a notch or shoulder 47 of the drop rod to hold the same in lifted position, and a trip arm 48, with which coöperates an inclined surface 49 on the hammer 50. These parts may be of any approved construction, such as that shown. The rock shaft is spring-actuated to cause the latch to engage the drop rod when not prevented from doing so by the coöperating portion of the hammer, and it is to the construction and arrangement of this spring that the feature of my invention now under consideration particularly relates. The rock shaft 43 is extended above the bearing 44 for a distance sufficient to receive thereon a spring 51, coiled around the upward extension of said rock shaft and secured thereto at its upper end. The lower end of the spring 51 is secured to a pin 52, which projects upward from a tension plate 53 supported on the bearing 44, through which tension plate the rock shaft passes loosely through a central aperture 54. The plate 53 and bearing 44 are connected by a bolt 55 which prevents rotation of the tension plate, and provision is made for the adjustment of the tension and of the spring by forming a plurality of apertures 56 through the tension plate to receive the bolt. The bearing 44 has a plurality of apertures 57 also formed therethrough to receive the bolt 55, said apertures being separated from each other by a distance less than the distance separating the apertures 56. It is extremely desirable that the tension of the spring 51 shall be the minimum required to properly engage the latch with the drop rod, and by reason of the construction which I have just described the said tension can be adjusted with great nicety, the tension plate being provided with any suitable means for readily rotating it, as, for instance, radial apertures 58 to receive a pin for that purpose. If the desired tension requires a movement of the tension plate less than through the angular distance separating two of the apertures 56, then, by reason of the differentially placed apertures 57, the tension plate may be readily moved into position sufficiently near the desired position to be practically correct and at the same time bring some one of the apertures 56 into registry with some one of the apertures 57, whereupon the bolt 55 may be placed through said registering apertures to hold the tension plate in its adjusted position.

In practice, it is not infrequently the case that the lubricant employed in connection with the bearings of the gripping rolls escapes from those bearings and flows along the roll shaft to the roll, where it spreads over the surface of the same and diminishes the efficiency of its gripping action. To overcome this difficulty, I have devised a construction shown in detail in Figs. 15 and 16, in which 59 indicates the roll shaft, and 60 the roll mounted thereon by means of a hub or collar 61 at each end. Upon this hub or collar is fixed a sheet metal disk 62, the inner margin 63 of which is flanged out to fit the hub, while the body of the disk is radial, or in a plane at right angles to the axis of rotation of the disk. The outer margin of the disk is bent over to form a hollow or open bead 64, which serves to retain within its recess an absorbent body 65 of any suitable fibrous material. This disk serves to intercept the oil to prevent its having access to the face of the roll, such intercepted oil being retained by the absorbent material, which may be readily removed and replaced from time to time, as may be required.

I do not wish to be understood as limiting myself to the precise details of construction hereinbefore described and shown in the accompanying drawings, as it is obvious that the same may be varied without departing from the principle of my invention.

Having thus fully described my invention, what I claim as new and desire to secure by Letters Patent is:—

1. In a drop hammer, a guide for the upper end of the drop rod provided with a T-shaped slot, in combination with a drop rod having a head rectangular in cross section and provided with lateral grooves, whereby the guide embraces and fits its rear portion, said head having a pivot lug formed on the part thereof which lies outside of the guide, and a connecting rod for operating the roll-shifting eccentrics pivoted to said lug, substantially as described.

2. In a drop hammer, a drop rod bumper comprising a body, a contact plate, a rubber cushion interposed between said plate and body, a screw bolt engaging said plate and passing through said plate, cushion and body, extending above the latter, an abutment mounted on the upper end of said screw, and a spiral spring mounted on said screw and bearing against said abutment and body, substantially as described.

3. In a drop hammer, a drop rod bumper comprising a body, a contact plate, a rubber cushion interposed between said plate and body, a screw bolt engaging said plate and passing through said plate, cushion and body, extending above the latter, an abutment mounted on the upper end of said screw, and a spiral spring mounted on said screw and bearing against said abutment and body, said abutment comprising a bearing plate or washer, and adjusting and lock nuts mounted on the threaded portion of the screw bolt, substantially as described.

4. In a drop hammer, a rock shaft provided with a latch to engage the drop rod and with a trip arm to be engaged by the hammer, a bearing for said rock shaft, a tension plate loosely mounted on said rock shaft adjacent to the bearing, a spring connected to the rock shaft at one end, coiled around said shaft, and connected at its other end to the tension plate, whereby rotation of said plate adjusts the tension of the spring, and means for securing said plate to said bearing to prevent rotation thereof after adjustment, substantially as described.

5. In a drop hammer, a rock shaft provided with a latch to engage the drop rod and with a trip arm to be engaged by the hammer, a bearing for said rock shaft, a tension plate mounted loosely on said rock shaft adjacent to said bearing, a spring connected to the rock shaft at one of its ends, coiled around said shaft, and connected to the tension plate at its other end, said plate being provided with a plurality of adjusting apertures, said bearing being provided with a coöperating aperture with which the apertures of the plate may be caused to register, and a bolt or pin adapted to pass through the registering apertures to prevent rotation of the tension plate, substantially as described.

6. In a drop hammer, a rock shaft provided with a latch to engage the drop rod and with a trip arm to be engaged by the hammer, a bearing for said rock shaft, a tension plate mounted loosely on said rock shaft adjacent to said bearing, a spring connected at one of its ends to the rock shaft, coiled around said shaft, and connected at its other end to the tension plate, said tension plate being provided with a plurality of equally spaced adjusting apertures therethrough, said bearing having a plurality of apertures differentially spaced relatively to those of the plate, and a bolt or pin adapted to pass through the apertures of the plate and bearing, substantially as described.

In testimony whereof, I affix my signature in presence of two witnesses.

ARTHUR A. AMBLER.

Witnesses:
 J. J. WELTY,
 IRVINE MILLER.